(12) United States Patent
Keam et al.

(10) Patent No.: US 7,515,143 B2
(45) Date of Patent: Apr. 7, 2009

(54) UNIFORM ILLUMINATION OF INTERACTIVE DISPLAY PANEL

(75) Inventors: Nigel S. Keam, Redmond, WA (US); Steven N. Bathiche, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 11/364,319

(22) Filed: Feb. 28, 2006

(65) Prior Publication Data
US 2007/0200970 A1    Aug. 30, 2007

(51) Int. Cl.
*G06F 3/042*    (2006.01)
(52) U.S. Cl. .................. 345/175; 178/18.01; 178/18.09
(58) Field of Classification Search ................ 345/156, 345/157, 158, 168–172, 173, 175; 178/18.01, 178/18.09, 19.01, 19.05
See application file for complete search history.

(56) References Cited

U.S. PATENT DOCUMENTS

| | | | |
|---|---|---|---|
| 4,992,650 | A | 2/1991 | Somerville |
| 5,319,214 | A | 6/1994 | Gregory |
| 5,436,639 | A | 7/1995 | Arai |
| 5,483,261 | A | 1/1996 | Yasutake |
| 5,526,177 | A * | 6/1996 | Fantone ...................... 359/402 |
| 5,528,263 | A | 6/1996 | Platzker et al. |
| 5,821,930 | A | 10/1998 | Hansen |
| 5,831,601 | A | 11/1998 | Vogeley |
| 5,835,692 | A | 11/1998 | Cragun |
| 5,900,863 | A | 5/1999 | Numazaki |
| 5,920,688 | A | 7/1999 | Cooper |
| 5,940,076 | A | 8/1999 | Sommers |
| 5,973,315 | A | 10/1999 | Saldana |
| 6,128,003 | A | 10/2000 | Smith |
| 6,154,214 | A | 11/2000 | Uyehara |

(Continued)

FOREIGN PATENT DOCUMENTS

EP    0690407    5/2004

(Continued)

OTHER PUBLICATIONS

"3.6 Interpolation in Two or More Dimensions," Numerical Recipes in C: The Art of Scientific Computing, Chapter 3. Interpolation and Extrapolation. © 1988-1992, Cambridge University Press. Numberical Recipes Software. pp. 123-128.

(Continued)

*Primary Examiner*—Amr Awad
*Assistant Examiner*—Jeff Pelligrino
(74) *Attorney, Agent, or Firm*—Workman Nydegger

(57) ABSTRACT

An interactive display device employing a flat panel display (FPD). The interactive display device includes a housing, a flat panel display, a light diffusing layer, a visible light illumination system, and a non-visible light illumination system that is used for detecting objects adjacent to the FPD. Techniques are also described for providing uniform illumination of the FPD with visible light, when viewed from a plurality of viewing angles by a user, and for diffusing the visible illumination at a surface boundary of the FPD, such that a coherent image of an interior of the housing is at least partially obscured from view by the user. Non-visible light that has passed through the FPD is reflected from objects adjacent to the display, passes back through the FPD, and is detected within the housing.

13 Claims, 9 Drawing Sheets

U.S. PATENT DOCUMENTS

| | | | |
|---|---|---|---|
| 6,266,061 | B1 | 7/2001 | Doi |
| 6,340,119 | B2 | 1/2002 | He |
| 6,448,987 | B1 | 9/2002 | Easty |
| 6,469,722 | B1 | 10/2002 | Kinoe |
| 6,476,378 | B2 | 11/2002 | Nougaret |
| 6,522,395 | B1 | 2/2003 | Barnji |
| 6,529,183 | B1 | 3/2003 | MacLean |
| 6,614,422 | B1 | 9/2003 | Rafli |
| 6,654,007 | B2 | 11/2003 | Ito |
| 6,690,363 | B2 | 2/2004 | Newton |
| 6,710,770 | B2 | 3/2004 | Tomasi |
| 6,720,949 | B1 | 4/2004 | Pryor |
| 6,750,877 | B2 | 6/2004 | Rosenberg |
| 6,781,069 | B2 | 8/2004 | Silverstein |
| 6,791,530 | B2 | 9/2004 | Vernier |
| 6,812,907 | B1 | 11/2004 | Gennetten |
| 6,840,627 | B2 | 1/2005 | Olbrich |
| 6,959,102 | B2 | 10/2005 | Peck |
| 7,075,687 | B2 | 7/2006 | Lippert |
| 7,084,859 | B1 | 8/2006 | Pryor |
| 7,120,280 | B2 | 10/2006 | Biswas |
| 7,161,578 | B1 | 1/2007 | Schneider |
| 7,204,428 | B2 | 4/2007 | Wilson |
| 7,268,774 | B2 | 9/2007 | Pittel |
| 7,310,085 | B2 | 12/2007 | Holloway |
| 2001/0012001 | A1* | 8/2001 | Rekimoto et al. ............ 345/173 |
| 2002/0140910 | A1* | 10/2002 | Stark et al. ..................... 353/84 |
| 2004/0090524 | A1 | 5/2004 | Belliveau |
| 2004/0196371 | A1 | 10/2004 | Kono |
| 2005/0050476 | A1 | 3/2005 | SanGiovanni |
| 2005/0122308 | A1* | 6/2005 | Bell et al. ................... 345/156 |
| 2005/0277071 | A1 | 12/2005 | Yee |
| 2006/0010400 | A1 | 1/2006 | Dehlin |
| 2006/0092170 | A1 | 5/2006 | Bathiche |
| 2006/0289760 | A1 | 12/2006 | Bathiche |
| 2007/0063981 | A1* | 3/2007 | Galyean et al. ............. 345/173 |
| 2007/0157095 | A1 | 7/2007 | Bilow |

FOREIGN PATENT DOCUMENTS

| | | |
|---|---|---|
| FR | 27656077 | 8/2003 |
| WO | 98/19292 | 5/1998 |

OTHER PUBLICATIONS

"Bar Code 1,2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003 3pp.

Bier, Stone, Pier, Buston, and DeRose. "Toolglass and Magic Lenses: The See-Through Interface." Proceedings of Siggraph '93 (Anaheim, August). Computer Graphics Annual Conference Series, ACM, 1993, pp. 73-80. 8pp.

Blickenstorfer, Conrad H. "First Look: Acer TravelMate TM100 with Windows XP Tablet PC Edition." Pen Computing Magazine. Jul. 2002, pp. 47-47.

"DiamondSpin—Begs for Direct Manipulation Technology Is it in the Pen? Sony Leaps Out-of-the-Box Again Pen with Gummi." Mitsubishi/DiamondSpin. CHI 2004#3. Printed Apr. 30, 2004. 5pp.

Dietz and Leigh, "DiamondTouch: A Multi=User Touch Technology." UIST '01 Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http:www.electron-cap.com/GiftCards.htm. Printed Jan. 20, 2004 and May 16, 2004. © 2003. 2pp. Total (3pp printed).

Fukuchi And Rekimoto. Interaction Tehcniques for SmartSkin.: ACM UIST 2002 demonstration, 2002. 2pp.

Grabowski, Robert, "A Miniature Vidwo Laser Range Finder for Small Robots." available http://www.andrew.cmu.edu/~rig/research_hardware/laser_rangefinder.html. Printed May 16, 2004. 8pp.

Grant and Winograd. "Flexible, Collaborative Organization on a Tabletop." ACM CSCW 2002: Workshop on Co-located Tabletop Collaboration: Technologies and Directios. New Orleans, LA. Nov. 2002, pp. 1-4.

Horn, Berthold K.P. "Robot Vision." The MIT Press. Available http://mitpress.mit.edu/catalog/item/default.asp?ttype=2&tid=8388. Printed Dec. 17, 2003. 6pp. Total.

Horn, Berthold Klaus Paul. "Robot Vision." Binary Images: Topological Properties. The MIT Electrical Engineering and Computer Science Seriese. 1986. pp. 66-71 an cover page(s).

Hunter, Anderw. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

IR Distance Sensor.: Available http://www.diyelectronics.com/Accessories/IRDS.html (2pp) and http://www.diyelectronics.com/Accessories/GP2D05.html (1pg.). Printed Dec. 30, 2003. 3pp.

"Tangible Bits: Towards Seamless Interfaces between People, Bits and Atoms." Proceedings of CHI '97, Mar. 22-27, 1997, Atlanta, Georgia © 1997 ACM 0-89791-802-9/97/03. pp. 1.8.

Ishii, Wisneski, Orbanes, Chun, and Paradiso. "PinPongPlus: Design of an Athletic-Tangible Interface for Computer-Supported Cooperative Play." Proceedings of CHI '99, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." Extended Abstracts of CHI 2001, Seattle. Apr. 2001 pp. 269-270.

Kang, Sing Bing. "Radial Distortion Snakes." IAPR Workshop on Machine Vision Applications (MVA2000), Tokyo, Japan. Nov. 2000, pp. 603-606.

Klemmer, Newman, and Sapien. "The Designer's Outpost: A Task-Centered Tangible Interface for Web Site Information Design." Proceedings of Human Factors in Computing Systems: CHI 2000 Extended Abstracts. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." CHI Letters, The 14th Annual ACM Symposium on User Interface Soft Technology: UIST 2001. 3(2). pp. 1-10.

Kobayashi, Hirano, Narita, and Ishi. "A Tangible Interface for IP Network Simulation." CHI 2003, Apr. 5-10, 2003, F. Lauderdale, FL ACM 1-58113-630-7/03/0004. 2pp.

Koike, Sato, and Kobayashi. "Integrating Paper and Digital Information on EnhanceDesk: A Method for Reltime Finger Tracking on an Augmented Desk System." ACM Transaction on Computer-Human Interaction, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." Proceedings of the IEEE Virtual Relaity 2000 Conference, Mar. 18-22, 2000. New Brunswich, New Jersey: IEEE Computer Society, 2000. 8pp.

Leigh and Dietz "DiamondTouch Characteristics and Capabilities." Mitsubishi Electric Research Laboratories, Cambridge, Massachusetts, USA. Undated. 2pp. Magerkurth, Stenzel, and Prante. "STARS—A Ubiquitous Computing Platform fo rComputer Augmented Tabletop Games." 5th International Conference on Ubiquitous Computing (Ubicomp '03), Oct. 12-15, 2003, Seattle, Washington. 2pp.

Malandain, Gregoire. "Connected Components Extraction." Available http://www-sop.inria.fr/epidaure/personnel/malandai/segment/connese.html. Printed Dec. 18, 2003. 3pp.

Matsushita and Rekimoto. "HoloWall; Designing a Finger, Hand, Body, and Object Sensitive Wall." UIST '97 Banff, Alberta, Canada. © 1977 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." UIST '99, Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." Proceedings of UIST 2002, Oct. 27-30, 2002. © 2002 ACM. 10 pp.

Paradiso, Hsiao, Strickon, Lifton, and Adler. "Sensor systems for interactive surfaces." IBM Systems Journal, vol. 39, Nos. 3&4, 2000. pp. 892-914.

Patten, Ishii, Hines, and Pangaro. "Sensetable: A Wireless Object Tracking Platform for Tangible User Interfaces." Proceedings of CHI 2001, Mar. 31-Apr. 5, 2001, ACM Press, © 2001 ACM. 8 pp.

Patten, Recht, and Ishii. "Audiopad: A Tag-based Interface for Musical Performance." Proceedings of Conference on New Interface for Musical Expression (NIME '02). Dublin, Ireland, May 24-26, 2002 6pp.

Ramos and Balakrishnan. "Fluid Interaction Techniques for the Control and Annotation of Digital Video." UIST '03 Vancouver, B.C., Canada. © 2003 ACM 1-58133-636-06/03/0010. pp. 105-114.

Rekimoto and Ayatsuka "CyberCode: Designing Augmented Reality Environments with Visual Tags." Proc. Of UIST 2000, 2000. 10pp.

Rekimoto and Matsushita. "Perceptual Surfaces :Towards a Human and Object Sensitive Interactive Display." Proceedings of Workshop on Perceptural User Interactes (PUI'97), 1997. 3pp.

Rekimoto and Nagao. "The World through the Computer: Computer Augmented Interaction with Real World Environments." Proceedings of UIST'95, 1995. pp. 29-36.

Rekimoto and Saitoh. "Augmented Surfaces: A Spatially Coninuous Work Space for Hybrid Computing Environments." CHI '99, May 15-20, 1999. Pittsburgh, Pennsylvania. © ACM 1999 0-201-48559-1/99/05. pp. 378-385.

Rekimoto, Jun. "Matrix: A Realtime Object Identification and Reistration Method for Augmented Reality." Proc. Of Asia Pacific Computer Human Interaction (APCHI '98), 1998. 6pp.

Rekimoto, Jun. "Multiple-Computer User Interfaces: 'Beyond the Desktop' Direct Manipulation Environments." ACI CHI2000 Video Proceedings, 2000. 2pp.

Rekimoto, Jun. "Pick-and-Drop: A Direct Manipulation Technique for Multiple Computer Environments." Proceedings of UIST'97, 1997. pp. 31-39.

Rekimoto, Jun. "SmartSkin: An Infarastructure for Freehand Manipulation on Interactive Surfaces." CHI 2002, Apr. 20-25, 2002, Minneapolis, Minnesota. © 2001 ACM 1-58113-453-3/02/0004. 8pp.

Rekimoto, Ullmer, and Oba. "Data Tiles: A Modular Platform for Mixed Physical and Graphical Interactions." SIGCHI'01, Mar. 31-Apr. 4, 2001, Seattle, WA. © 2001 ACM 1-58113-327-8/01/0003. 8pp.

Reznik, Canny, and Alldrin. "Leaving on a Plane Jet." 2001 Int. Conf. on Intell. Robots & Systems (IROS), Maui, Hawaii, Oct. 2001. 6pp.

Ringel, Gerth, Jin, and Winograd. "Barehands: Implement-Free Interaction with a Wall-Mounted Display." Short Talk. CHI Mar. 31-Apr. 5, 2001. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." Home>Reviews, TablePCHome.com—Table PC user community. Posted Apr. 10, 2003. Available http://www.tabletpchome.com/Messages.aspx?ThreadID=140. Printed Dec. 30, 2003, pp. 1-2 of 5

Schmalstieg, Encarnação, and Szalavári. "Using Transparent Props for Interaction With The Virtual Table." Presented at 1999 ACM Symposium on Interactiave 3D Graphics (I3DG '99). Apr. 26-28, 1999, Atlanta, GA. 7pp.

Scott, Grant, and Mandryk. "System Guidelines for Co-located collaborative Work on a Tabletop Display." Proceedings of ECSCW'03, European Conference Computer-Supported Cooperative Work 2003, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." Interactions. Mar.+Apr. 2003. pp. 15-22.

Shen, Lesh, Bernier, Forlines, and Frost. "Sharing and Building Digital Group Histories." CSCW'02, Nov. 16-20, 2002, New Orleans, Louisiana. © 2002 ACM 1-58113-560-2/02/0011. 10pp.

Shen, Lesh, and Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." CHI 2004, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection SMART Board TM Interactive Whiteboard"0 "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary,Lyons, Gandy, and Pair. "Towards Augmented Reality Gaming." Available http://www.gvu.gatech.Edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." Proceedings of the ACM Conference on Human Factors in Computing Systems (CHI'99), Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." Pen Computing Magazine: Tablet PC. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." Proceedings of the 14. Annual ACM Symposium on User Interface Software and Technoic (USIT'01), ACM Press (CHI Letters 3(2)),2001,pp. 11-20 (10pp).

Ullmer and Ishii. "The metaDESK: Models and Prototypes for Tangible User Interfaces." Proceedings of UIST'97, Oct. 14-17, 1997. © 1997 ACM-ACM 0-89791-881-9/97/10. 10pp.

Ullmer, Ishii and Glas. "mediaBlocks: Physical Containers, Transports, and Controls for Online Media." Computer Graphics Proceedings (SIGGRAPH'98), Jul. 19-24, 1998, © 1998 ACM. ACM-0-89791-999-88/98/007. 8pp.

Ullmer, Ishii and Jacob. "Tangible query Interfaces: Physically Constrained Tokesn for Manipulating Database Queries." Proc. INTERACT 2003 Conference, 2003. 11pp.

Underkoffler and Ishii. "Illuminating Light: An Optical Design Tool with a Luminous-Tangible Interface." Proceeding of CHI '98, Apr. 18-23, 1998, © 1998 ACM. pp. 1-8.

Underkoffler and Ishii. "Urp: A Luminous-Tangible Workbench for Urban Planning and Design." Proceedings of CHI '99, May 15-20, 1999. © 1998 ACM. pp. 1-8.

Underkoffler Ullmer, and Ishii. "Emancipated Pixels: Real-World Graphics in the Luminous Room." Proceedings of SIGGRAPH '99, Aug. 8-13, 1999, © 1999 ACM. 8pp.

Vernier, Lesh and Shen. "Visualization Techniques for Circular Tabletop Interfaces." To appear in Advanced Visual Interfaces, May 2002, Trento, Italy, © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VirtualBoard." Available http://visilab.unime.it/visilab/virtualboard.htm. Printed Dec. 16, 2003. 6pp.

Von Hardenberg and Bérard, Bare-Hand Human-Computer Interaction. PUI 2001 Orlando, FL, © 2001 ACM 1-58113-448-7-11/14/01. 8pp.

Wellner, Pierre. "Interacting with Paper on the DigitalDesk." Communications of the ACM. Jul. 1993. EuroPARC tech report EPC-93-195. 17pp.

Whalen, Tara. "Playing well with Others: Applying Board Game Design to Tabletop Display Interfaces." UIST 2003. Vancouver, Nov. 2-5, 2003, 3pp.

Wu and Balakrishnan. "Multi-Finger and Whole Hand Gestural Interaction Techniques for Multi-User Tabletop Displays." UIST '03, Vancouver, B.C., Canada. © 2003 ACM 1-58113-636-6/03/0010. pp. 193-202.

Hardenberg Von. Christian, "Fingertracking and Handposture Recognition for Real-Tim Human-Computer Interaction", Berlin, Jul. 20, 2001.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Pavlidis, Ioannis, et al. "A Vehicle Occupant Counting System Based on Near-Infrared Phenomenology and Fuzzy Neural Classification", IEEE Transactions on Intelligent Transportation Systtem, New York, NY, vol. 1, No. 2., Jun. 2000, pp. 78-80.

"The Tracking Cube: A Three Dimensional Input Device" IBM Techincal Disclosure Bulletin, IBM Corp. New York, US, vol. 32, No. 3B; Aug. 1, 1989, pp. 91-95.

Northop Grumman "TouchTable™" Brochure © 2005 Northop Grumman Space & Mission Systems Corp. RS1190705. 2pp.

Department of Defence, Department of Defence Logistics Automatic Identification Technology Handbook for Product and Shipping Label Quality Assurance, Feb. 15, 2000, p. 14, Section 3.3.3.6, http://www.dodait.com/conf/data1199/printquality/print0111r6.doc.

Office Action mailed Jun. 29, 2007 cited in related U.S. Appl. No. 10/834,675.

Office Action dated Aug. 30, 2007 cited in related U.S. Appl. No. 10/870,777.

Office Action dated Dec. 13, 2007 cited in related U.S. Appl. No. 10/834,675.

Office Action dated Oct. 9, 2007 cited in related U.S. Appl. No. 10/867,434.

Notice of Allowance dated Feb. 28, 2008, cited in related U.S. Appl. No. 10/870,777.

Notice of Allowance dated Mar. 28, 2008 cited in related U.S. Appl. No. 10/834,675.

Notice of Allowance mailed Feb. 27, 2008 cited in related U.S. Appl. No. 10/814,761.

Office Action dated Mar. 25, 2008 cited in related U.S. Appl. No. 10/880,167.

Notice of Allowance dated Apr. 23, 2008 cited in related U.S. Appl. No. 10/969,746.

Office Action dated Jun. 12, 2008 cited in related U.S. Appl. No. 11/117,979.

Office Action dated Oct. 9, 2007 cited in related U.S. Appl. No. 10/813,855.

Office Action dated May 7, 2008 cited in related U.S. Appl. No. 10/813,855.

Office Action dated Jul. 10, 2008 cited in U.S. Appl. No. 10/867,434.

Office Action dated Feb. 8, 2008 cited in U.S. Appl. No. 11/321,551.

Office Action dated Aug. 19, 2008 cited in U.S. Appl. No. 11/321,551.

Notice of Allowance dated Oct. 16, 2007 cited in U.S. Appl. No. 10/814,761.

Office Action dated Aug. 29, 2008 cited in U.S. Appl. No. 10/870,777.

Office Action dated Sep. 2, 2008 cited in U.S. Appl. No. 11/170,234.

Notice of Allowance dated Sep. 11, 2008 cited in U.S. Appl. No. 11/117,979.

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

Lensch, Hendrick, P.A.; Goesele, Michael; Jan Kautz; Hans-Peter Seidel; "A Framework for the Acquisition, processing, Transmission, and Interactive Display of High Quality 3D Models on the Web" Research Report, Max-Planck-Institute, May 2001; Sections 5 and 8.

Notice of Allowance dated Oct. 8, 2008 cited in U.S. Appl. No. 10/880,167.

Notice of Allowance Dated Oct. 17, 2008 cited in U.S. Appl. No. 10/969,746.

Office Action dated Oct. 7, 2008 cited in U.S. Appl. No. 11/218,171.

Office Action dated Oct. 30, 2008 cited in U.S. Appl. No. 12/106,910.

\* cited by examiner

UNIFORM ILLUMINATION OF INTERACTIVE DISPLAY PANEL

BACKGROUND

The utility and enjoyment of computer systems can be enhanced by providing better user interfaces. User interfaces for computers systems have evolved significantly since the personal computer (PC) first became widely available. Early PCs were limited to user input devices, such as the keyboard and serial mouse, and were primarily text-based. However, a vast improvement in the speed and the power of microprocessors, a much greater available low-cost memory, and improved programming functionality have all contributed to the advancement of much more sophisticated user interface designs and the development of user-friendly graphic operating systems and hardware.

One particular area of advancement in user interface technology pertains to the recent development of an interactive display, to which a number of commonly assigned patent applications have been directed. An interactive display presents graphic images to a user on a flat surface, such as the top of a table or other housing format. In addition, this surface is responsive to input by a user. A PC is coupled to the interactive display to provide the processing power that yields a rich user interactive experience, offering more sophisticated command and interface features, and a far more natural interactive approach in providing input to the system, particularly as related to displayed images.

Interactive display systems that have been developed typically employ an optical system for generating images, and for detecting user input. However, such optical systems usually require an image projection system, which is relatively expensive, requires a relatively large housing, and which must be maintained in close alignment relative to the optical components that sense input. One alternative developed to address the inherent problems of a projection system for image display is the use of a liquid crystal display (LCD) panel. LCD displays work by changing the polarization of incident light and by filtering out light which is not polarized in the same orientation as the LCD. This function is typically achieved using a sandwich of fixed polarizing sheets and active liquid crystal elements. The activation of the liquid crystal elements controls the amount of light that is able to pass through each part of the display. Additionally, a mosaic of color filters is overlaid or embedded within the LCD panel so that individual elements only transmit specific ranges of visible light, thus achieving a full color display. However, an interactive display must also be configured to detect objects placed on or near the surface upon which images are displayed. For example, a camera can be placed behind the surface to sense light reflected from an object on or immediately adjacent to the surface. Unfortunately, using visible light illumination for object detection would interfere with an image displayed on the LCD panel.

A typical illumination source for an LCD panel is a thin fluorescent tube that produces light input to the edge of a sheet of transparent material, such as acrylic, that comprises the panel. Light from the fluorescent tube travels within this acrylic sheet light guide, bouncing off the surfaces due to internal reflection until it reaches a point on the surface which has been deliberately roughened, enabling the light to escape the light guide. Other light guide techniques include the use of scattering of bumps or an angled wedge. However, many LCD panels are quite translucent and if the illumination of the LCD panel is not uniform within the enclosure that houses the LCD panel, darkened areas can appear when the display is viewed at certain angles.

Therefore, there is current interest in finding solutions to the above problems with LCD panels for use with an interactive display that can provide detection of items on a display surface, while also providing uniform surface illumination when viewed by users, regardless of the viewing angle. The solution should enable the display of graphic images on the panel while not interfering with the detection of objects on or near the surface of the panel. Thus, it will be important to avoid using an illumination source for detecting objects that produces light visible to the user, since that would interfere with the displayed image. Of course, it is also important that items on the display surface be detected, regardless of the currently displayed image.

SUMMARY

Several implementations of an interactive display are described below in detail. One aspect of these implementations that are described relates to a method for configuring an interactive display that employs a flat panel display for displaying images to a user. The described method includes the step of providing a visible light illumination for the flat panel display. The illumination is configured to provide a substantially uniform illumination of the surface of the display when viewed from a plurality of viewing angles by a user, in order to avoid darkened areas of the display due to parallax. The method further describes the step of providing a diffusion of the illumination at a surface boundary of the display such that a coherent image of an object below a viewing plane of the display is at least partially obstructed from view by the user. The method then describes a step of providing user input detection. The user input detection can be based on detecting infrared illumination reflected from objects adjacent to the surface boundary of the display and wherein the display is configured to be substantially transparent to the infrared illumination. Any user input detection components within the interactive display that are positioned beneath the display panel are at least partially obscured from view by the step of diffusing the visible illumination.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 8:
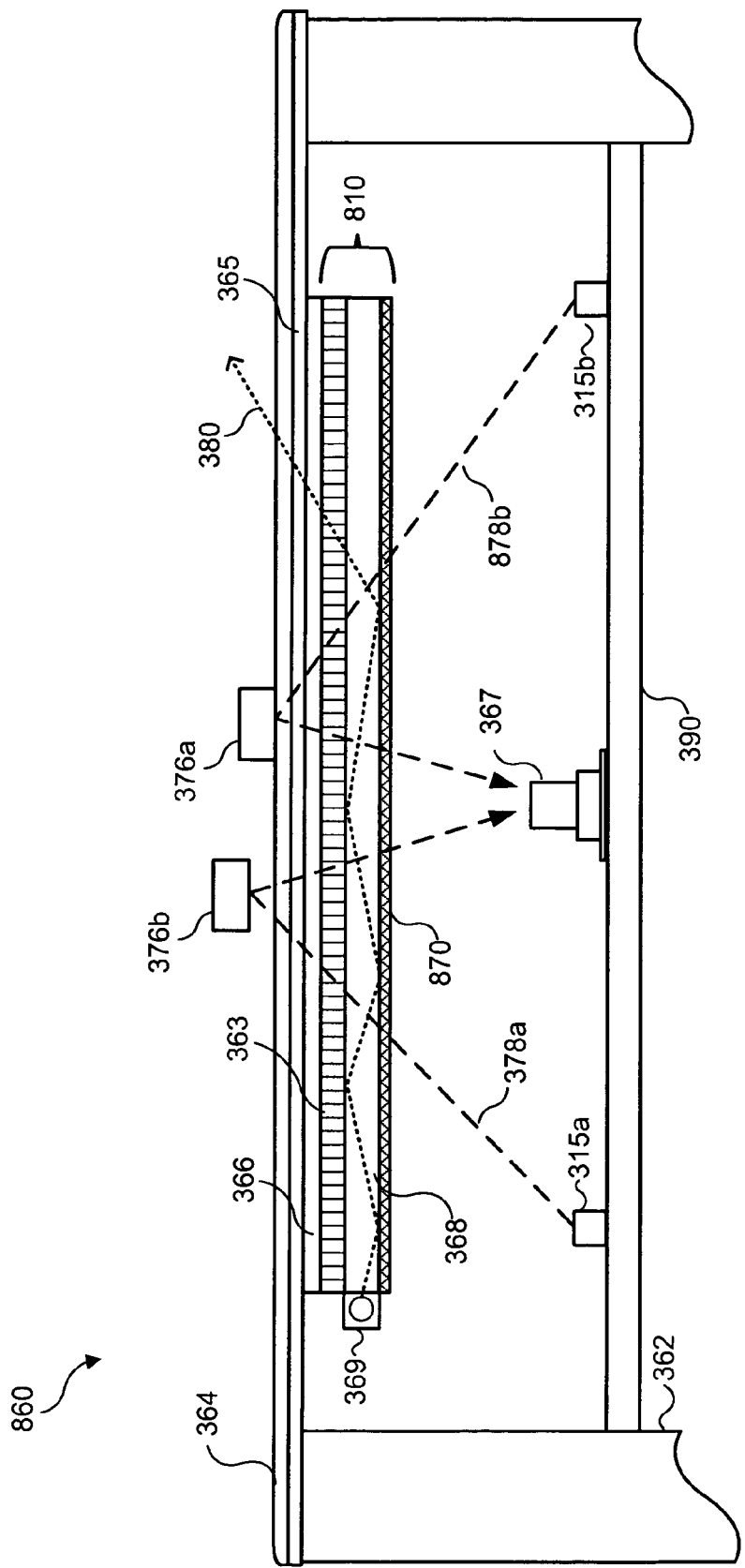
Figure 9:
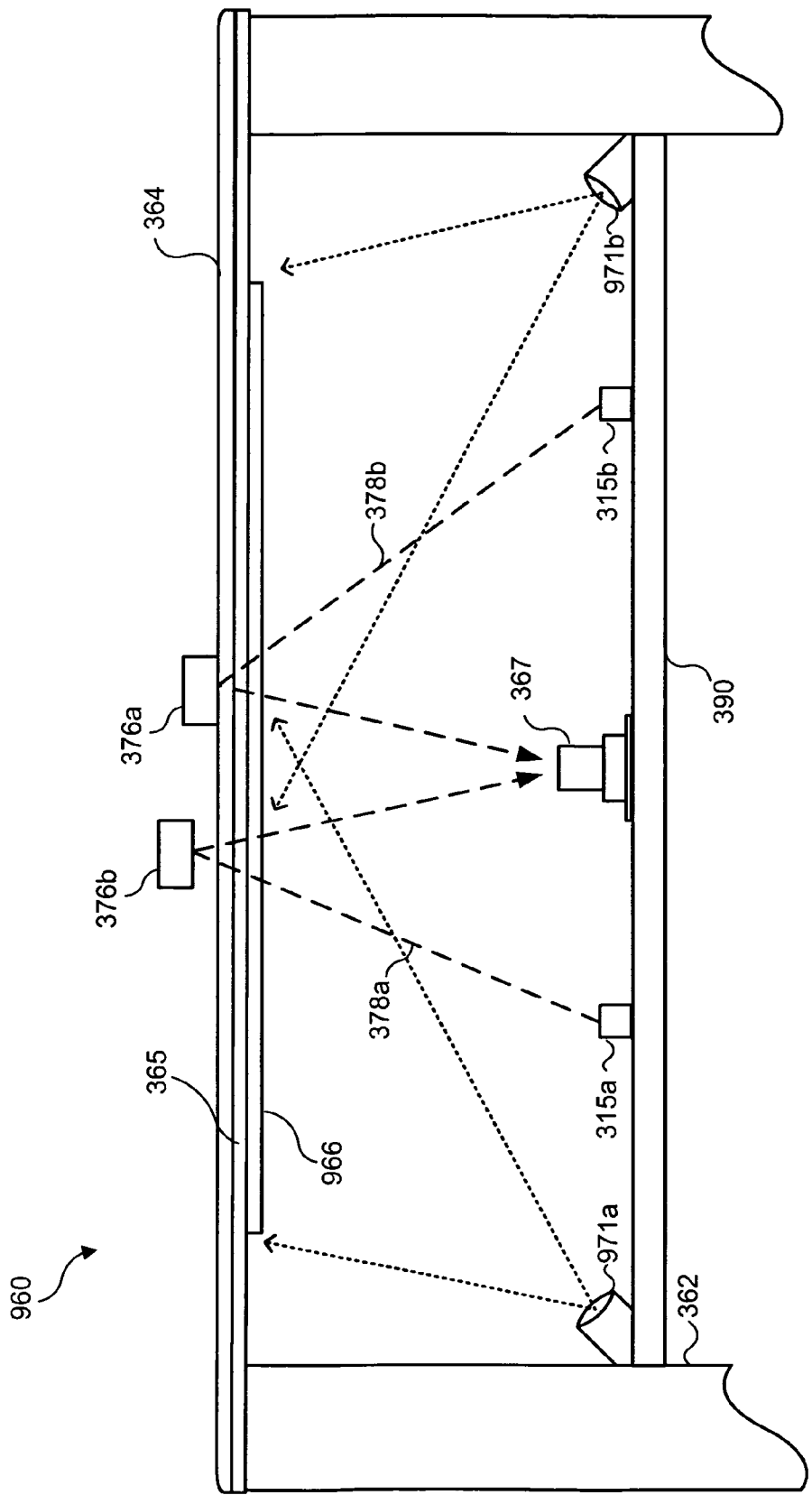

FIG. 8 is a schematic cross-sectional illustration of an LCD panel-based interactive display table that includes an exemplary embodiment of an illumination system that is immediately adjacent to the LCD panel; and FIG. 9 is a schematic cross-sectional illustration of an LCD panel-based interactive display table that includes an exemplary embodiment of an illumination system that directly illuminates the LCD panel.

DESCRIPTION

Interactive Display System

Figure 1:
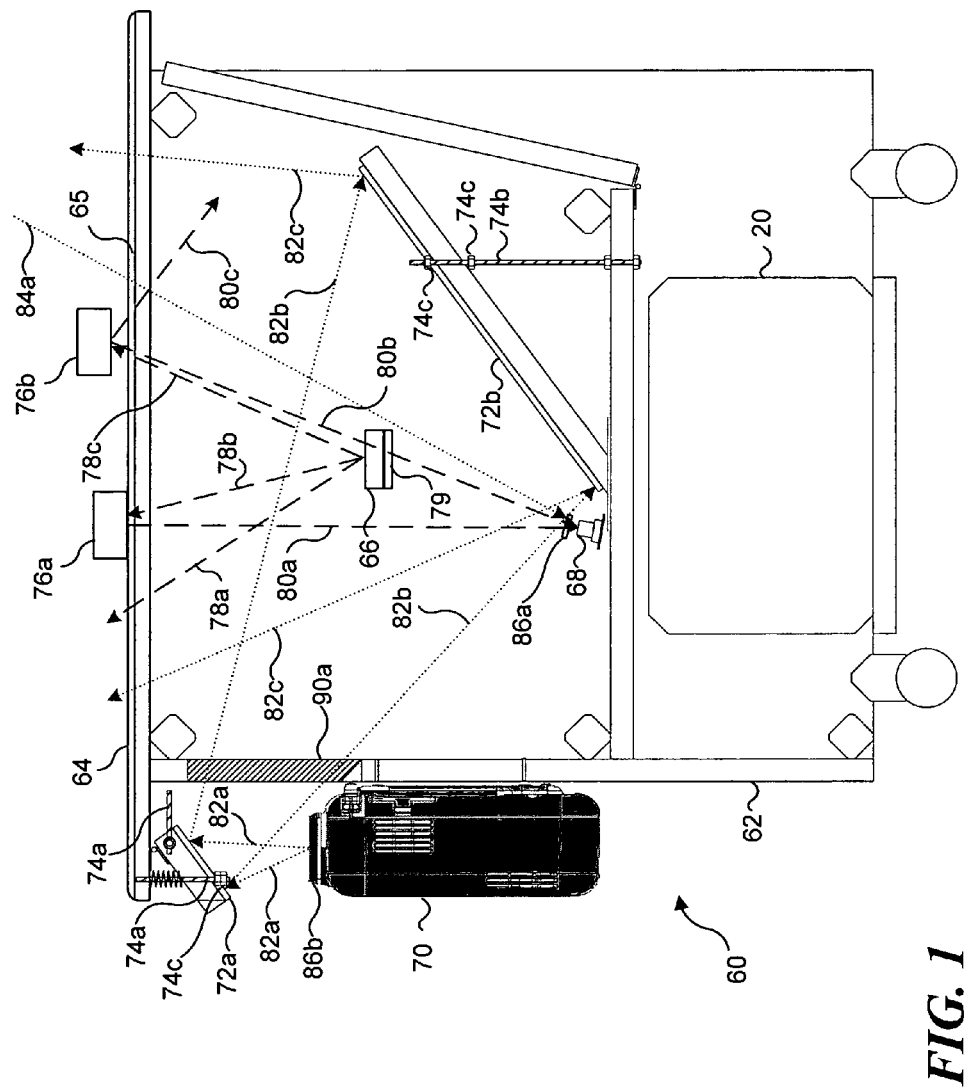
FIG. 1 is a cross-sectional view illustrating internal components of an interactive display table system that includes an integral PC, but does not employ the present approach discussed below.

In FIG. 1, an exemplary interactive display table 60 is shown that includes a personal computer (PC) 20 within a frame 62 and which serves as both an optical input and video display device for the PC. This embodiment of the interactive display table does not include a flat panel display, such as an LCD panel. This embodiment is shown for comparison to the exemplary embodiments of FIGS. 2 through 9 that do include an LCD panel. Also, this Figure should help to clarify how the interactive display system operates to both display images on an interactive display surface, as well as detecting objects that are on or adjacent to the interactive display surface.

In this cut-away Figure of interactive display table 60, rays of light 82a-82c used for displaying text and graphic images are generally illustrated using dotted lines, while rays of infrared (IR) light used for sensing objects on or just above a user interface surface 64 of interactive display table 60 are illustrated using dash lines. The perimeter of the table surface around the actual display area in the center is useful for supporting a user's arms or other objects, including objects that may be used to interact with the graphic images or virtual environment being displayed on user interface surface 64.

IR light sources 66 preferably comprise a plurality of IR light emitting diodes (LEDs) and are mounted on the interior side of frame 62. The IR light that is produced by IR light sources 66 is directed upwardly toward the underside of user interface surface 64, as indicated by dash lines 78a, 78b, and 78c. The IR light from IR light sources 66 is reflected from any objects that are atop or proximate to the display surface after passing through a translucent layer 65 of the table, comprising a sheet of vellum or other suitable translucent material with light diffusing properties. As used herein and in the description that follows in connection with objects positioned on or proximate to the interactive display surface, the term "adjacent to" is used with the intention that this term encompass both an object that is actually touching the interactive display surface as well as one that is just above the interactive display surface. Although only one IR source 66 is shown, it will be appreciated that a plurality of such IR sources may be mounted at spaced-apart locations around the interior sides of frame 62 to provide an even illumination of user interface surface 64. The IR light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above user interface surface 64 include a "touch" object 76a that rests atop the display surface and a "hover" object 76b that is close to but not in actual contact with the display surface. Thus, both touch and hover objects are "adjacent to" the display surface, as that term is used herein. As a result of using translucent layer 65 to diffuse the IR light passing through the display surface as an object approaches the top of user interface surface 64, the amount of IR light that is reflected by the object increases to a maximum level that is achieved when the object is actually in contact with the display surface.

A digital video camera 68 is mounted to frame 62 below user interface surface 64 in a position appropriate to receive IR light that is reflected from any touch object or hover object disposed above user interface surface 64. Digital video camera 68 is equipped with an IR pass filter 86a that transmits only IR light and blocks ambient visible light traveling through user interface surface 64 along dotted line 84a. In the illustrated implementation, a baffle 79 is disposed between IR source 66 and digital video camera 68 to prevent IR light that is directly emitted from the IR source from entering the digital video camera. It is preferable that the digital video camera should produce an output signal that is only responsive to the IR light reflected from objects that are a short distance above or in contact with user interface surface 64. In this manner, only light that corresponds to an image of IR light reflected from objects on or above the display surface will be detected. It will be apparent that digital video camera 68 will also respond to any IR light included in the ambient light that passes through user interface surface 64 from above and into the interior of the interactive display, including ambient IR light that also travels along the path indicated by dotted line 84a.

IR light reflected from objects on or above the table surface may be reflected back through translucent layer 65, through IR pass filter 86a and into the lens of digital video camera 68, as indicated by dash lines 80a and 80b or reflected or absorbed by other interior surfaces within the interactive display without entering the lens of digital video camera 68, as indicated by dash line 80c.

Translucent layer 65 diffuses both incident and reflected IR light. Thus, as explained above, "hover" objects such as hover object 76b that are closer to user interface surface 64 will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to the PC 20 for processing to determine a location of each such object, and optionally, the size, orientation, and shape of the object. It should be noted that a portion of an object, such as a user's forearm, may be above the table while another portion, such as the user's finger, is in contact with the display surface. In addition, an object may include an IR light reflective pattern or coded identifier, such as a bar code, on its bottom surface that is specific to that object or to a class of related objects of which that object is a member. Accordingly, the imaging signal from the digital video camera 68 can also be used for detecting each such specific object, as well as determining its orientation, based on the IR light reflected from its reflective pattern, in accord with the present invention.

The illustrated interactive display table is operable to recognize an object and/or its position relative to the user interface surface 64 by detecting its identifying characteristics using the IR light reflected from the object. The logical steps implemented to thus detect and identify an object and its orientation are explained in the commonly-assigned patent applications, including application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," both of which were filed on Mar. 31, 2004.

Figure 2:
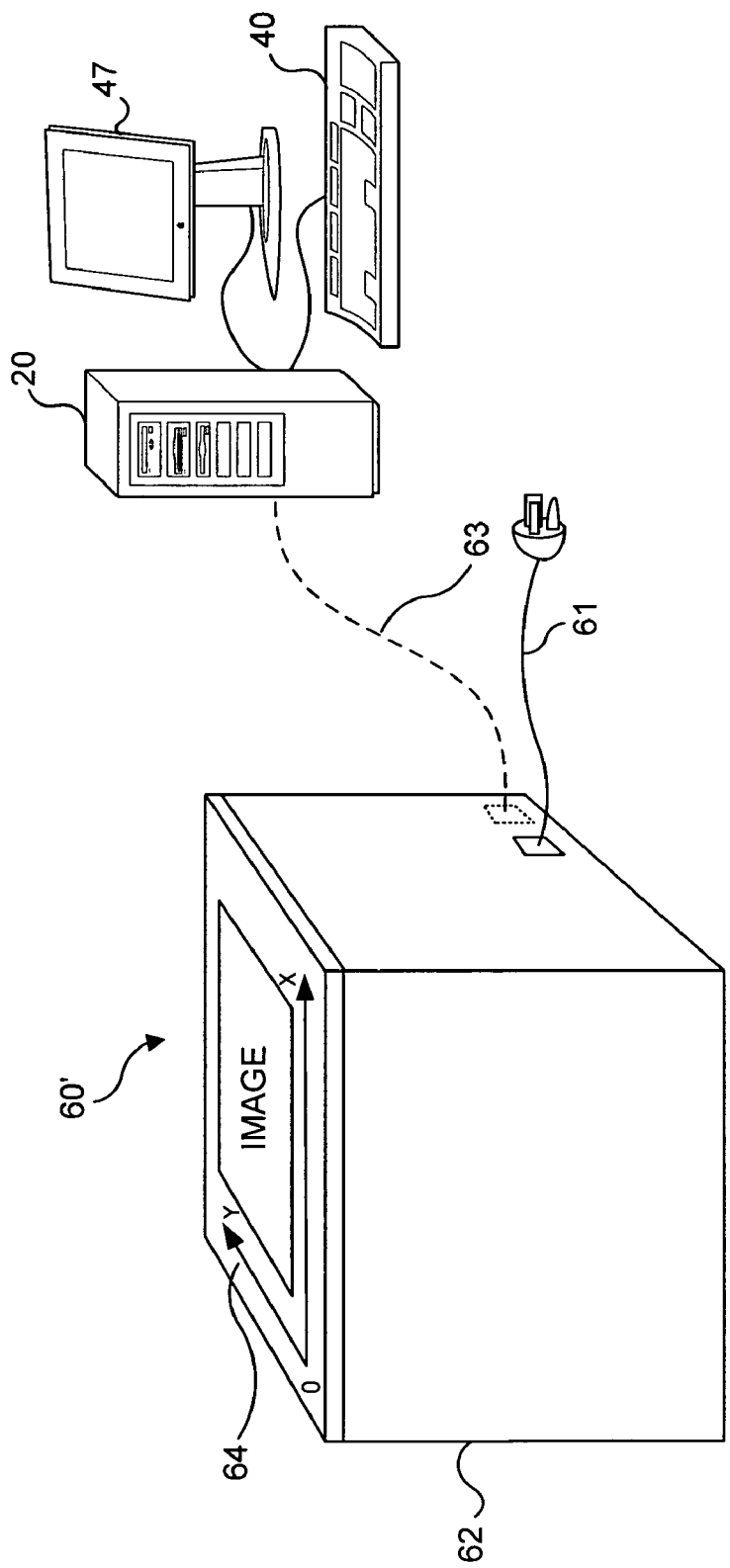
FIG. 2 is an isometric view of an embodiment in which an LCD-based interactive display table, which may include an embodiment of the present IR detection system, is connected to an external PC.

PC 20 may be integral to interactive display table 60 as shown in FIG. 1, or alternatively, may instead be external to the interactive display table, as shown in the embodiment of FIG. 2. In FIG. 2, an interactive display table 60' is connected through a data cable 63 to an external PC 20 (which includes optional monitor 47, as mentioned above). The embodiment of FIG. 2 may include a flat panel display such as a liquid crystal display (LCD) panel or an organic light emitting diode (OLED) display panel, details of which are discussed below in connection with FIGS. 3-9. External PC 20 can be connected to interactive display table 60' via a wireless link (i.e., WiFi or other appropriate radio signal link). As also shown in this Figure, a set of orthogonal X and Y axes are associated with user interface surface 64, as well as an origin indicated by "0." While not discretely shown, it will be appreciated that a plurality of coordinate locations along each orthogonal axis can be employed to specify any location on user interface surface 64.

If an interactive display table 60' is connected to an external PC 20 (as in FIG. 2) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high speed wireless connection, or via some other appropriate wired or wireless data communication link. Whether included internally as an integral part of the interactive display, or externally, PC 20 executes algorithms for processing the digital images from the digital video camera used for sensing objects on or adjacent to the display surface and executes software applications that are designed to employ the more intuitive user interface functionality of the interactive display table to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table is its ability to display graphic images or a virtual environment for games or other software applications and to enable an interaction between the graphic image or virtual environment visible on user interface surface 64 and identify objects that are resting atop the display surface, such as an object 76a, or are hovering just above it, such as an object 76b.

Again referring to FIG. 1, interactive display table 60 includes a video projector 70 that is used to display graphic images, a virtual environment, or text information on user interface surface 64. In this implementation, the video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above user interface surface 64. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64b, which is at the focal point of the projector lens, so that the projected image is visible and in focus on user interface surface 64 for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

The foregoing discussions describe an interactive display device in the form of interactive display table 60 (or alternatively, of interactive display table 60'). Nevertheless, it should be understood that the interactive display surface need not be in the form of a generally horizontal table top and need not be formed as a table that rests on the floor, but instead can be formed as a device that sits on a table or other surface and which can include a display surface that can face in directions other than vertical. The principles employed for the approach described herein suitably also include and apply to display surfaces of different shapes and curvatures and that are mounted in orientations other than horizontal. Further, although the following description refers to placing physical objects "on" the interactive display surface, physical objects may be placed adjacent to the interactive display surface by placing the physical objects in contact with the display surface or otherwise adjacent the display surface. It should be appreciated that the exemplary display systems described above in connection with FIGS. 1 and 2 are not limited to any specific type of display or sensing technology, and are merely provided as exemplary implementations of various interactive display systems in order to demonstrate an operating environment and common components used with other interactive display implementations.

Figure 3:
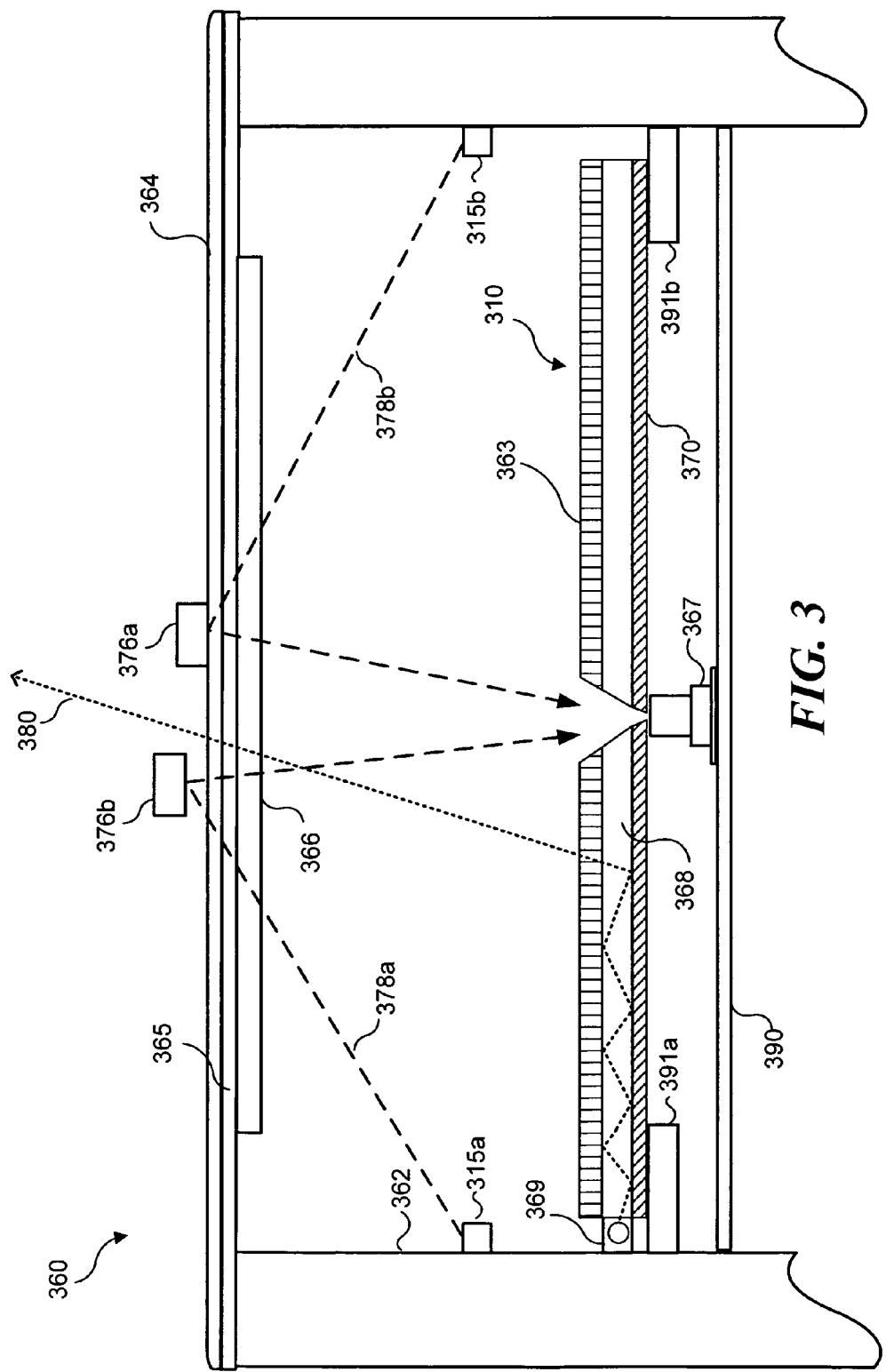
FIG. 3 is a schematic cross-sectional illustration of an LCD panel-based interactive display table that includes an exemplary embodiment of an illumination system that is spaced apart from the LCD panel.

FIG. 3 is a schematic cross-sectional illustration of a flat panel display (FPD) based interactive display table 360, which includes an exemplary embodiment of an illumination system 310 that is spaced apart from the FPD. It should be noted that while the following descriptions that refer to FIGS. 3-9 each employ an LCD panel, any suitable flat panel display having the desired characteristics can be also employed in any of the described implementations. Non-limiting examples of usable flat-panel displays include: LCD panels, plasma displays, and organic light emitting diode (OLED) displays. However, LCD displays have certain properties that enable such displays to readily transmit infrared light. In particular, the polarizers in many LCD panels do not polarize in the non-visible infrared range. In fact, infrared illumination passes through both the fixed polarization layers of the LCD panel and the active liquid crystal elements regardless of their activation state. A further point of note is that many of the color filters used in color LCD displays are also semi-transparent to infrared illumination.

As illustrated in FIG. 3, display table 360 includes a user interface surface 364 that is coupled to LCD panel 366 via a diffusing layer 365. Although diffusing layer 365 is shown in FIG. 3 as extending along the length of user interface surface 364, in other implementations (not shown), diffusing layer 365 can be coupled to LCD panel 366, which can then be coupled to user interface surface 364. Diffusing layer 365 generally prevents objects below the viewing plane of the LCD panel from being clearly visible to a user, i.e., the slight diffusion of visible illumination provided by the diffusing layer prevents a clear view through the LCD panel, into the interior of interactive display table 360, where various user input detection components and LCD illumination components reside and might otherwise be visible to a user.

An interactive table chassis 362 supports user interface surface 364. Illumination system 310 is shown supported by supports 391a and 391b. A support 390 is shown supporting a camera 367 configured for detecting non-visible light (e.g., rays 378a and 378b of IR light) reflected from objects on or adjacent to user interface surface 364, such as "touch" object 376a and "hover" object 376b. Non-visible light illuminants 315a and 315a are shown coupled to chassis 362. It should be understood that any number of illuminants such as 315a and 315b can be employed within interactive display table 360 in order to fully illuminate user interface surface 364 with non-visible light. Furthermore, it should be noted that non-visible illuminants can be placed in any suitable location within the housing, between illumination system 310 and LCD panel 366.

As illustrated in FIG. 3, illumination system 310 includes several components. A diffusing layer 363 is coupled to a light guide assembly 368 that includes a visible light illuminant 369 for generating a homogeneous or uniform illumination of LCD panel 366 (e.g., as provided by a ray 380). A backplane 370 is also illustrated coupled to light guide assembly 368. Backplane 370 can be formed of any material suitable for substantially reflecting visible light. In some implementations, backplane 370 can be an opaque white acrylic sheet. In other implementations, diffusing layer 363 can be one or more (or a combination of) light diffusing layers and collimating lenses, for example, Fresnel lenses. Light diffusing layer 363 is generally configured to condition visible light emitted from light guide assembly 368 in order to most effectively illuminate LCD panel 366.

Visible light assembly 368 can include a light guiding layer formed of a suitable material, such as an acrylic sheet. In other implementations, visible light illuminant 369 can be a cold cathode fluorescent tube configured to edge light an acrylic sheet that is included in the LCD panel. In yet another implementation, illuminant 369 can be white light LEDs that are optically coupled to edge of the acrylic light guide. The implementation and operation of light guides for backlighting LCD panels will be well known to those skilled in the art, and therefore, need not be discussed in further detail.

In this exemplary configuration of interactive table 360, illumination system 310 and LCD panel 366 are spaced apart. The spacing between illumination system 310 and LCD panel 366 can range from a few centimeters to several inches depending upon the specific implementation and materials used for these components. Although not illustrated in FIG. 3, interactive table 360 can include additional components such as a PC, a power supply, and an audio subsystem. There are several specific exemplary embodiments of the interactive table using the configuration that is illustrated in FIG. 3, which are described below in connection with FIGS. 4-7. As appropriate, components common to the exemplary embodiment illustrated in FIG. 3 share the same reference numbers in the Figures that follow.

Figure 4:
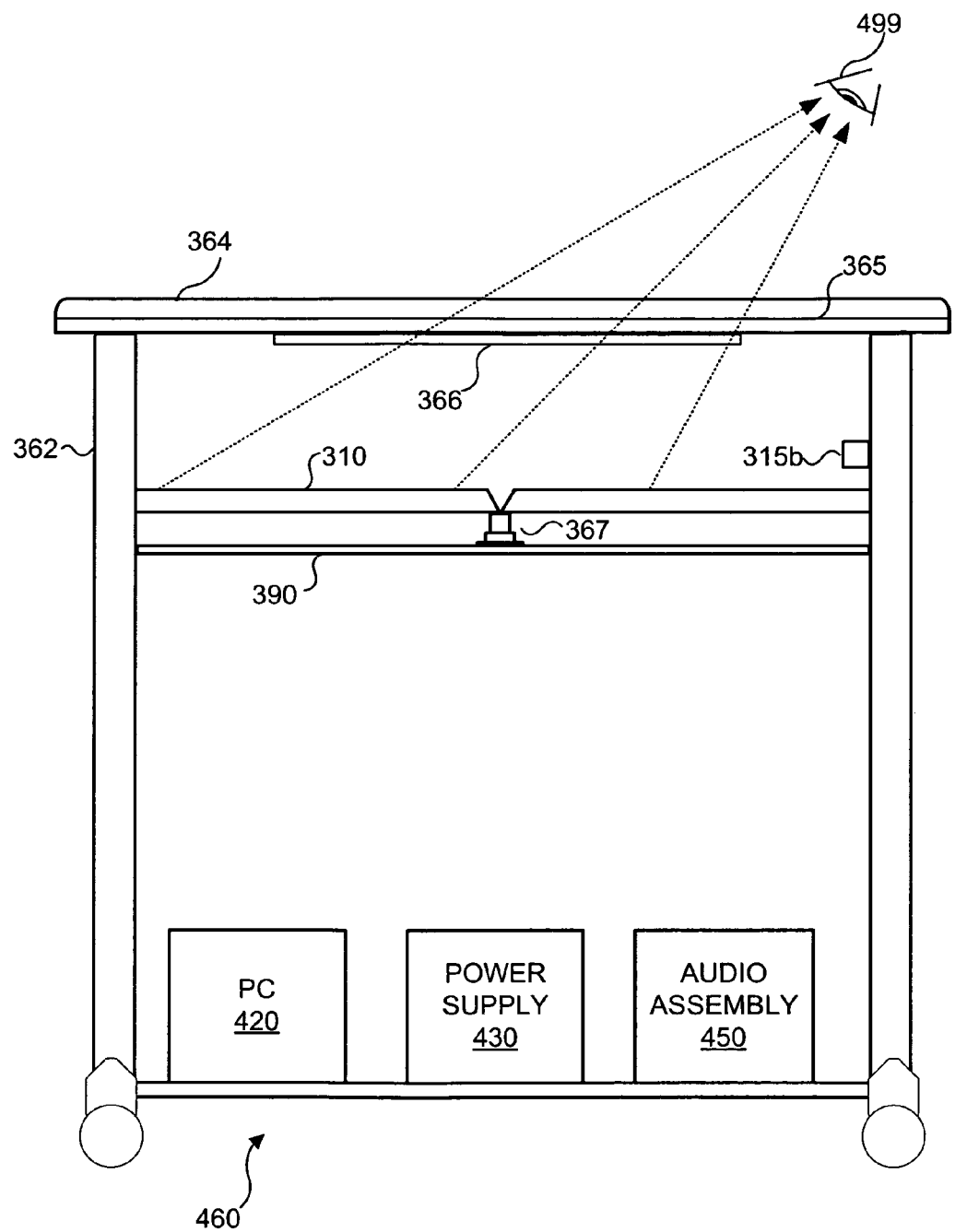
FIG. 4 is another schematic cross-sectional illustration of an LCD panel-based interactive display table that includes an exemplary embodiment of an illumination system that is spaced apart from the LCD panel.

Turning now to FIG. 4, a schematic cross-sectional illustration of an interactive display table 460 is depicted that includes illumination system 310, as shown in FIG. 3. Interactive display table 460 again includes display chassis 362, user interface surface 364 coupled to diffusing layer 365, and LCD display 366. Non-visible light illuminant 315b (e.g., an IR light source) is coupled to display chassis 362. It should be understood that while only one non-visible light illuminant is depicted in FIG. 4, any suitable number of the non-visible light illuminants can be employed to adequately illuminate user interface surface 364. FIG. 4 further includes a PC 420, a power supply 430 and an audio assembly 450.

PC 420 can be any computing device suitable for enabling the operation of interactive table 460, such as PC 20, which was described in connection with FIGS. 1 and 2. Power supply 430 can be any suitable supply for providing power to components of interactive table 460, at an appropriate voltage/current level. Audio assembly 450 can be any combination of audio input and output devices including, but not limited to, power amplifiers, speakers, microphones, sound processing hardware, and the like, and can also be coupled to a sound card (not separately shown) included in PC 420.

The configuration of the exemplary embodiment shown in FIG. 4 is notable for providing a surface area for illumination system 310 that is substantially greater than the surface area of LCD panel 366. As a result of this greater area of the illumination system, a user 499 will perceive a uniform illumination of LCD panel 366 from a wide variety of viewing angles relative to the LCD panel, since the illumination provided by illumination system 310 extends sufficiently outside the outer boundaries of LCD panel 366 to prevent user 499 from perceiving dark areas on the LCD panel due to parallax.

Figure 5:
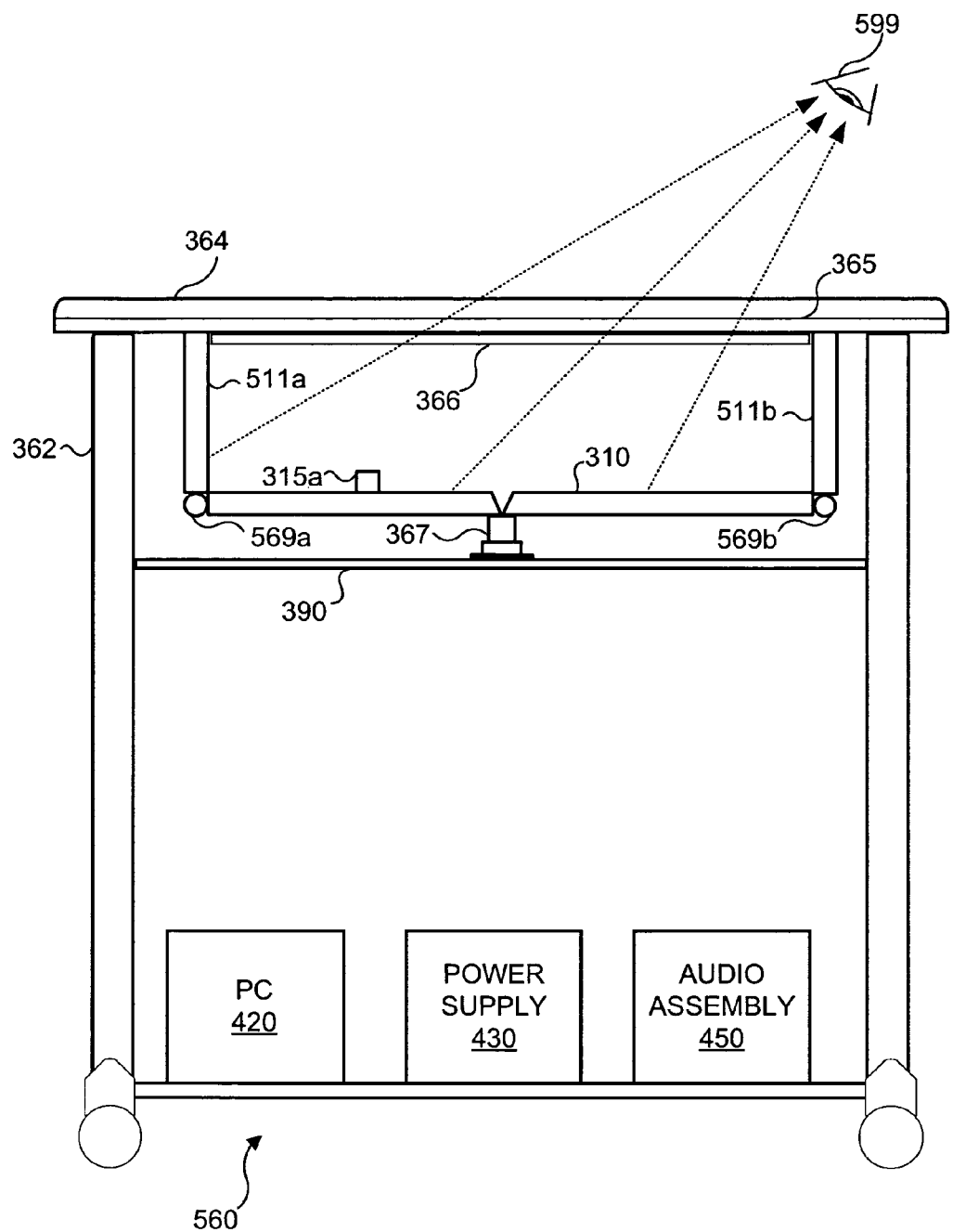
FIG. 5 is yet another schematic cross-sectional illustration of an LCD panel-based interactive display table that includes an exemplary embodiment of an illumination system that is spaced apart from the LCD panel.

FIG. 5 is a schematic cross-sectional illustration of yet another LCD panel-based interactive display table 560 that includes illumination system 310 that is again spaced apart from the LCD panel, just as in FIG. 3. Interactive display table 560 includes display chassis 362, user interface surface 364 coupled to diffusing layer 365 and LCD display 366. Non-visible light illuminant 315a is again illustrated. However, illuminant 315a is now illustrated as being coupled to illumination system 310. In one example, illuminant 315a can be one of a plurality of infrared emitting LEDs that are disposed at regular intervals upon a surface of illumination system 310. FIG. 5 again includes PC 420, power supply 430, and an audio assembly 450.

The embodiment shown in FIG. 5 further provides illumination system 310 with side panels 511a and 511b, that are respectively illuminated with visible light illuminants 569a and 569b that introduce light into the edges of the side panels. As illustrated in FIG. 5, the side panels extend perpendicularly from each edge of the upper surface of illumination system 310 to a lower surface of user interface surface 364, forming a closed illumination box with LCD panel 366 forming the top of the closed illumination box. In one implementation (not shown), side panels 511a and 511b can be coupled to interactive display chassis 362, such that the interior side walls of interactive display 560 are illuminated. As a result of adding these side panels, a user 599 will perceive a uniform illumination of LCD panel 366 from a wide variety of viewing angles relative to the LCD panel, since the illumination provided by illumination system 310 and the addition of panels 511a and 511b prevents user 599 from perceiving dark areas on LCD panel 366 due to parallax. In one implementation, side panels 511a and 511b can be light guides such as acrylic sheets. In another implementation, side panels 511a and 511b can include component layers, such as one or more diffusers, one or more lenses, a light guide and a backplane reflective of visible light. In one example, side panels 511a and 511b are identical in structure to illumination system 310, sharing the same configuration of diffusing layers, lenses, light guides and reflected back planes. In this example, visible light illuminants 569a and 569b can be configured to concurrently illuminate side panels 511a and 511b as well as the light guide of illumination system 310. It should be noted that the implementation of interactive table 560 is shown in cross section, and therefore, can include additional components that are not illustrated, including additional side panels that are illuminated, such that each side of illumination system 310 will have an side panel illuminated to further improve the uniformity of illumination provided for LCD panel 366.

Figure 6:
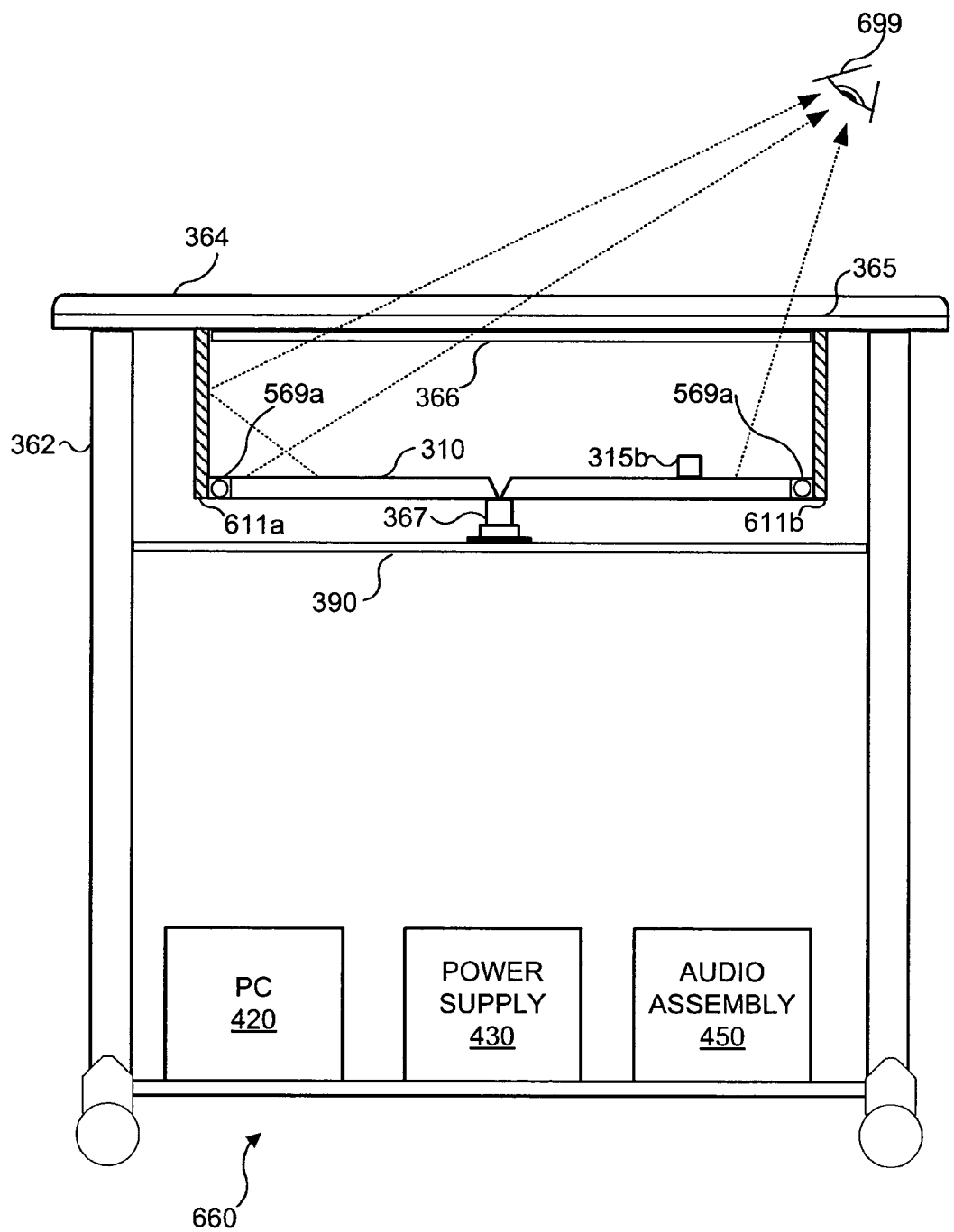
FIG. 6 is still another schematic cross-sectional illustration of an LCD panel-based interactive display table that includes an exemplary embodiment of an illumination system that is spaced apart from the LCD panel.

A simplified configuration, illustrated by an interactive table 660 in FIG. 6, replaces the side panels 511a and 511b of FIG. 5 with side panels 611a and 611b that simply reflect visible light, saving materials cost compared to the exemplary implementation illustrated in FIG. 5. As with each of the previously described embodiments, a user 699 will perceive a uniform illumination of LCD panel 366 from a wide variety of viewing angles relative to the LCD panel, since the illumination provided by illumination system 310 and reflected by side panels 611a and 611b prevents user 699 from perceiving dark areas on LCD panel 366 due to parallax.

Figure 7:
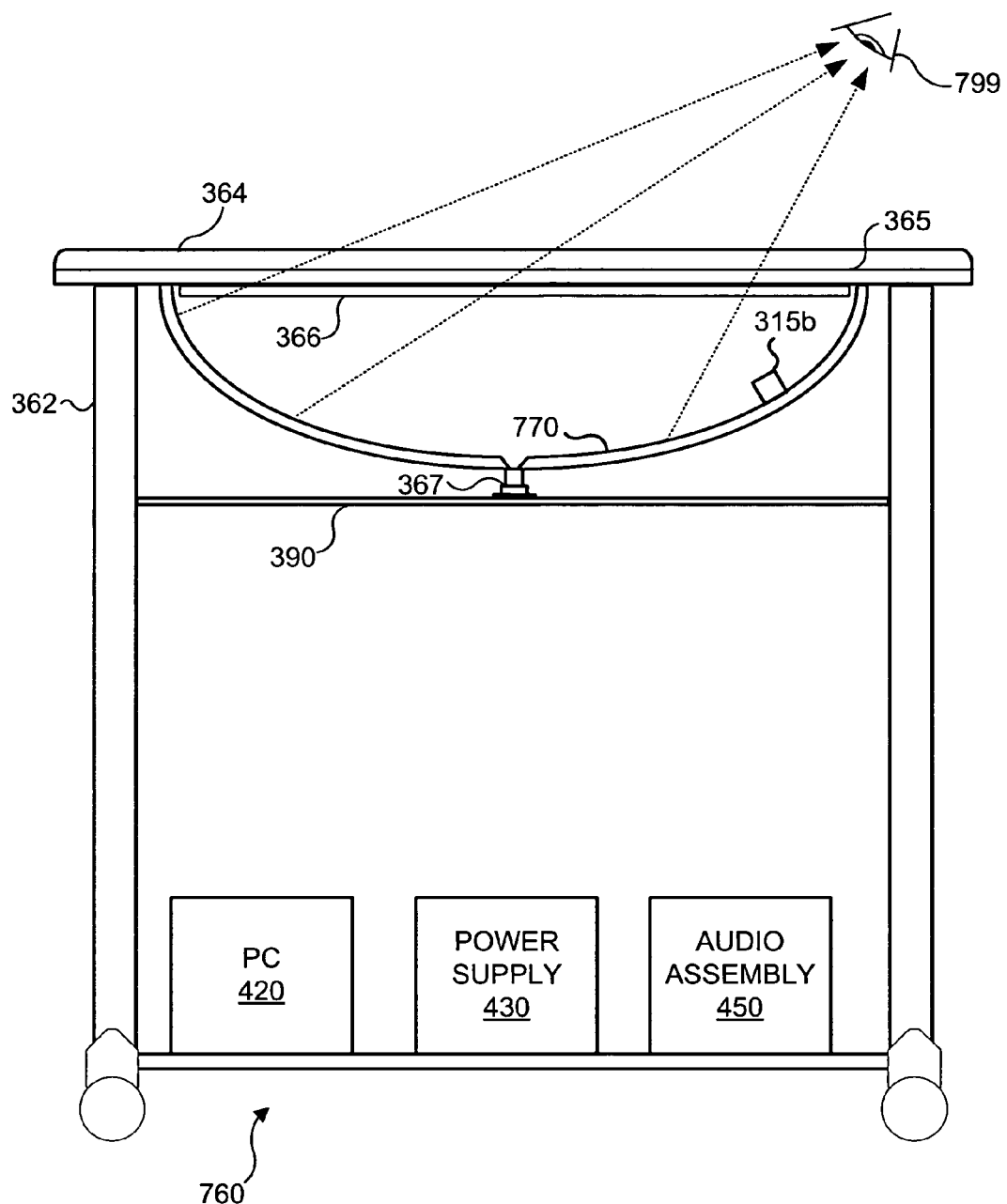
FIG. 7 is another schematic cross-sectional illustration of an LCD panel-based interactive display table that includes an exemplary embodiment of an illumination system that is spaced apart from the LCD panel.

Still another simplified configuration, illustrated by an interactive table 760 in FIG. 7, employs an illumination system 770 that is formed as a curvilinear panel that is spaced apart from LCD panel 366 at a central point, but having edges that curve up to meet user interface surface 364 around a perimeter of LCD panel 366. This implementation is functionally similar to the embodiment illustrated in FIG. 4, since the practical effect of curving illumination system 770 up to meet user interface surface 364 is the same as extending the area of illumination system 310 substantially beyond the area of LCD panel 366. As a result of this curved configuration, a user 799 will perceive a uniform illumination of LCD panel 366 from a wide variety of viewing angles relative to the LCD panel, since the illumination provided by curved illumination system 310 will prevent user 799 from perceiving dark areas on LCD panel 366 due to parallax.

FIG. 8 is a schematic cross-sectional illustration of an LCD panel-based interactive display table 860 that includes an exemplary embodiment of an illumination system 810 that is disposed immediately adjacent to the LCD panel. The implementation illustrated in FIG. 8 shares many components and features that are included in the embodiment illustrated in FIG. 3, and therefore, functionally similar components have the same reference numbers in each Figure. As illustrated in FIG. 8, display table 860 includes user interface surface 364, LCD panel 366, and diffusing layer 365. Although diffusing layer 365 is again shown extending along the length of user interface surface 364, in other implementations (not shown), diffusing layer 365 can be coupled to LCD panel 366, which can then be coupled to user interface surface 364.

Interactive table chassis 362 supports user interface surface 364. Illumination system 810 is shown immediately adjacent to LCD display 366 and user interface surface 364. Support 390 is shown supporting camera 367 in a suitable position for detecting non-visible light (e.g., IR light) reflected from objects on or adjacent to user interface surface 364, such as "touch" object 376a and "hover" object 376b. Notably, and unlike the embodiment illustrated in FIG. 3, rays 378a and 378b are shown in FIG. 8 passing through illumination system 810. Non-visible light illuminants 315a and 315a are now shown coupled to support 390. It should again be understood that any number of illuminants like illuminants 315a and 315b can be employed within interactive display table 860 in order to fully illuminate user interface surface 364 with non-visible light. Furthermore, it should be noted that non-visible illuminants can be placed in any suitable location within interactive display chassis 362 such that user interface surface 364 is effectively illuminated with the non-visible light.

As illustrated in FIG. 8, illumination system 810 includes several components. Diffusing layer 363 is coupled to light guide assembly 368, which includes visible light illuminant 369 for generating a homogeneous uniform illumination of LCD panel 366 (e.g., as indicated by ray 380). A reflective backplane 870 is also illustrated coupled to light guide assembly 368. Backplane 870 can be formed any material suitable for substantially reflecting visible light while also permitting non-visible illumination to pass through. In one implementation, backplane 870 is implemented as a "cold mirror." As discussed above, diffusing layer 363 can be one or more (or a combination of), light diffusing layers and collimating lenses, including Fresnel lenses. Visible light assembly 368 can again include a light guiding layer formed of any suitable material, such as an acrylic sheet. In other implementations, visible light illuminant 369 can be a cold cathode fluorescent tube configured to edge light an acrylic sheet. It should be noted that in contrast to the embodiments of FIGS. 3-7, in the configuration of interactive table 860, illumination system 810 and LCD panel 366 are immediately adjacent to each other. Indeed, in some implementations, illumination system 810 and LCD panel 366 can be in direct contact, and in other implementations illumination system 810 and LCD panel 366 can be separated by up to several millimeters. As a result of disposing the illumination system immediately adjacent to the LCD panel, a user will again perceive a uniform illumination of LCD panel 366 from a wide variety of viewing angles, since the illumination provided by illumination system 310 will be continuous across LCD panel 366 due to the close proximity of the illumination source.

FIG. 9 is a schematic cross-sectional illustration of an LCD panel-based interactive display table 960 that includes an exemplary embodiment of an illumination system that directly illuminates the LCD panel. The implementation illustrated in FIG. 9 again shares many components and features with the embodiment illustrated in FIG. 3, and therefore, the same reference numbers are used in both Figures for the same components. As illustrated in FIG. 9, interactive display table 960 includes user interface surface 364, LCD panel 366, and diffusing layer 365. Although diffusing layer 365 is again shown extending along the length of user interface surface 364, in other implementations (not shown), diffusing layer 365 can be coupled to LCD panel 366, which can then be coupled to user interface surface 364.

Interactive table chassis 362 supports user interface surface 364. Support 390 is shown supporting camera 367, which is employed for detecting non-visible light (e.g., IR light) reflected from objects on or adjacent to user interface surface 364, such as "touch" object 376a and "hover" object 376b (e.g., as indicated by rays 378a and 378b). Non-visible light illuminants 315a and 315a are shown coupled to support 390. It should again be understood that any number of non-visible light illuminants of this type can be employed within interactive display table 960 in order to fully uniformly illuminate user interface surface 364 with non-visible light. Furthermore, it should be noted that non-visible illuminants can be placed in any suitable location within interactive display chassis 362, such that user interface surface 364 is effectively illuminated with the non-visible light.

Unlike the embodiments illustrated in FIGS. 3-8, interactive display 960 includes a direct illumination system in the form of visible light illuminants 971a and 971b. In the simplified exemplary embodiment illustrated in FIG. 9, visible light illuminants 971a and 971b flood the underside of LCD panel 366 with visible light in such a manner that a substantially uniform illumination of the LCD panel is achieved. It should be understood, however, that visible light illuminants 971a and 971b are merely exemplary, and in other implementations, any suitable number of visible light illuminants can be employed to directly illuminate LCD panel 366. As a result of this direct illumination of LCD panel 366, a user will perceive a uniform illumination of LCD panel 366 from a wide variety of viewing angles, since the illumination provided by the direct lighting will prevent the user from perceiving dark areas on LCD panel 366 due to parallax. This direct illumination is diffused by diffusing layer 365, which evens out the intensity of the direct illuminants and prevents a clear view of objects below the viewing plane of the LCD panel.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for providing substantially uniform illumination of a liquid crystal display (LCD) panel that is located at a viewing surface of an interactive display, whereby the LCD panel is uniformly illuminated such that graphical output of the LCD panel is homogenously illuminated and visible to a user, regardless of the user's viewing angle with respect to the viewing surface and without the effects of parallax that may otherwise cause the user to perceive darkened areas in the LCD panel when viewing the interactive display from certain angles, and for detecting objects that are in contact with or in close proximity to a user interface layer of the viewing surface of the interactive display, comprising the steps of:

(a) illuminating the LCD panel of the interactive display with visible light that has been emitted and diffused by an illumination system, and such that illumination of the LCD panel and of the corresponding viewing surface of the interactive display is substantially uniform when the viewing surface of the interactive display is viewed from a plurality of substantially different viewing angles, wherein the illumination system used to illuminate the LCD panel with visible light in a substantially uniform manner comprises:

a light guide assembly that includes a visible light illuminant and a light guiding layer, wherein the light guiding layer is a physical material directly coupled to the visible light illuminant and that is configured to conduct the light emitted from the visible light illuminant;

a diffusing layer comprising one or more light diffusing layers or collimating lenses configured to condition visible light emitted from the light guide assembly and to transmit diffused light to the LCD panel in order to effectively illuminate the LCD panel; and a backplane layer;

wherein at least the physical material of the light guiding layer is interposed between the diffusing layer and the backplane layer and wherein the light guide assembly is positioned in direct physical contact with both of the backplane layer and the diffusing layer;

wherein the visible light for illumination of the LCD panel is generated by the following:

the visible light illuminant illuminating the light guiding layer with generated visible light;

the backplane layer substantially reflecting portions of the generated visible light away from the backplane layer and back into the light guiding layer towards the diffusing layer; and the one or more light diffusing layers or collimating lenses of the diffusing layer conditioning the generated visible light, such that when the generated visible light leaves the illumination system and illuminates the LCD panel, the LCD panel is substantially uniformly illuminated;

(b) diffusing the visible light received at the viewing surface of the interactive display with a layer of diffusing material such that an object below the viewing surface of the interactive display is at least partially obscured from view by the user; and (c) illuminating the viewing surface of the interactive display with non-visible light for use in detecting objects disposed in contact with or adjacent to the user interface layer of the viewing surface, wherein the viewing surface of the interactive display is composed of materials that are substantially transparent to the non-visible light such that reflected non-visible light, which has passed through the viewing surface of the interactive display and has been reflected back into the interactive display from the objects in contact with or adjacent to the user interface layer of the viewing surface, is detected.

2. An interactive display system that provides for detection of objects that are disposed adjacent to a user interface surface while simultaneously providing for homogeneous illumination with visible light of a liquid crystal display (LCD) panel such that graphical output of the LCD panel is uniformly illuminated and visible by a user from a plurality of viewing angles without perceived dark areas that may otherwise occur as a result of parallax, the interactive display system comprising:

an interactive display housing;

a user interface surface, which is part of a viewing surface of the interactive display system;

a first light diffusing layer, which is part of the viewing surface of the interactive display system, and which obscures, from view of the user, components of the interactive display system that are below the viewing surface and not intended to be seen;

a liquid crystal display (LCD) panel, which is part of the viewing surface of the interactive display system;

an illumination system, which generates the homogeneous illumination with visible light of the LCD panel, wherein each component of the illumination system is directly coupled to at least one other component of the illumination system, the illumination system comprising a light guide assembly that includes a visible light illuminant and a light guiding layer, wherein the light guiding layer includes a physical material that is directly coupled to the visible light illuminant and that is configured to conduct the light emitted from the visible light illuminant;

a second diffusing layer comprising one or more light diffusing layers or collimating lenses configured to condition visible light emitted from the light guide assembly and to transmit diffused light to the LCD panel in order to effectively illuminate the LCD panel; and a backplane layer;

wherein at least the physical material of the light guiding layer is interposed between the second diffusing layer and the backplane layer and wherein the light guide assembly is positioned in direct physical contact with both of the backplane layer and the second diffusing layer;

a non-visible light illumination system for illuminating the objects that are adjacent to the user interface surface with non-visible light that has passed from the non-visible light illumination system through the viewing surface of the interactive display system; and a sensor for detecting non-visible light that is reflected back through the viewing surface of the interactive display system from the objects that are adjacent to the user interface surface.

3. The interactive display system of claim 2, wherein the second diffusing layer of the illumination system is a Fresnel lens configured to condition visible light emitted from the light guide in order to provide uniform illumination to the LCD panel.

4. The interactive display system of claim 2, wherein the light guiding layer comprises an acrylic sheet, and wherein the visible light illuminant comprises at least one of a fluorescent tube or an LED positioned along an edge of the acrylic sheet light guiding layer such that light emitted from the light illuminant is caused to be guided by the acrylic sheet.

5. The interactive display of claim 2, wherein the illumination system is disposed immediately adjacent to the LCD panel.

6. The interactive display system of claim 2, wherein the illumination system is substantially spaced apart from the LCD panel.

7. The interactive display system of claim 6, wherein a main portion surface area of the illumination system comprises the surface area of a topmost layer of the illumination system, and wherein the main portion surface area of the illumination system is substantially greater than a surface area of the LCD panel such that illumination of the LCD panel is substantially uniform when viewed from a plurality of viewing angles by a user.

8. The interactive display system of claim 6, wherein the illumination system further comprises side portions being reflective of visible light and being disposed perpendicular to a main portion of the illumination system and extending from the main portion to the user interface surface thereby forming a closed illumination system with the LCD panel and the user interface surface such that illumination of the LCD panel is substantially uniform when viewed from a plurality of viewing angles by a user.

9. The interactive display system of claim 6, wherein a main portion of the illumination system is substantially curvilinear such that a continuous surface is formed extending to the user interface surface from a center point of the main portion thereby forming a closed illumination system with the LCD panel and user interface surface such that illumination of the LCD panel is substantially uniform when viewed from a plurality of viewing angles by a user.

10. The interactive display system of claim 6, wherein the illumination system further comprises illuminated side portions disposed substantially perpendicular to a main portion of the illumination system and extending to the viewing surface of the interactive display system from the main portion of the illumination system to form a closed illumination system with the LCD panel such that illumination of the LCD panel is substantially uniform when viewed from a plurality of viewing angles by a user, wherein the illuminated side portions are similar in composition to the main portion of the illumination system such that each comprise the light guide assembly, including the second diffusing layer, and the reflective backplane.

11. The interactive display system of claim 2, wherein the non-visible light illumination system comprises a plurality of infrared illuminants disposed within the interactive display housing for illuminating the interactive display surface with infrared illumination and wherein the sensor for detecting non-visible light comprises a digital camera sensitive to infrared illumination.

12. The interactive display of claim 5, wherein the illumination system is immediately adjacent and coupled to the LCD panel and comprises:

the light guide assembly having the visible light illuminant configured to illuminate at least one edge of the light guiding layer with visible light;

the second diffusing layer comprising at least one Fresnel lens and at least one light diffuser; and the backplane comprising a cold mirror that is specifically configured to allow passage of the reflected non-visible light through the cold mirror, which is reflected from the objects to the sensor, and while causing visible light generated by the light guide assembly to be reflected away from the sensor.

13. The interactive display of claim 2, wherein the first diffusing layer is interposed between the user interface surface and the liquid crystal display (LCD) panel.

* * * * *